(12) United States Patent
Harries et al.

(10) Patent No.: US 7,102,620 B2
(45) Date of Patent: Sep. 5, 2006

(54) MOBILE ELECTRONIC DEVICE

(75) Inventors: Andrew Stanely Guy Harries, Vancouver (CA); Jon Theron Winebrenner, Vancouver (CA); Joseph Peter Robert Tosey, North Vancouver (CA); Norman Roy Eldridge, Richmond (CA); Jamian Russell Cobbett, Portland, OR (US); Mark H. Hoeveler, Portland, OR (US)

(73) Assignee: Sierra Wireless, Inc. (CA)

( * ) Notice: Subject to any disclaimer, the term of this patent is extended or adjusted under 35 U.S.C. 154(b) by 515 days.

(21) Appl. No.: 10/330,871

(22) Filed: Dec. 24, 2002

(65) Prior Publication Data

US 2004/0119685 A1 Jun. 24, 2004

(51) Int. Cl.
H04M 1/00 (2006.01)
H04M 1/26 (2006.01)
G09G 5/00 (2006.01)

(52) U.S. Cl. .................. 345/169; 345/156; 345/905; 379/433.07; 379/368

(58) Field of Classification Search ............. 345/156, 345/169, 901, 902, 905; 455/566, 575.1, 455/575.3; 715/778, 797, 802, 808, 975; 379/433.06, 433.11, 433.12, 433.13
See application file for complete search history.

(56) References Cited

U.S. PATENT DOCUMENTS

| 4,180,336 A | 12/1979 | Lonsdale |
|---|---|---|
| D296,692 S | 7/1988 | Besford et al. |
| D304,175 S | 10/1989 | Sakaguchi et al. |
| D312,628 S | 12/1990 | Yokoi et al. |
| D313,401 S | 1/1991 | Tanabe |
| D313,413 S | 1/1991 | Langton |
| D338,461 S | 8/1993 | Paton et al. |
| 5,337,346 A | 8/1994 | Uchikura |
| 5,584,054 A | 12/1996 | Tyneski et al. |
| 5,644,338 A | 7/1997 | Bowen |
| 5,646,649 A | 7/1997 | Iwata et al. |
| 5,710,576 A * | 1/1998 | Nishiyama et al. ......... 345/169 |
| D390,509 S | 2/1998 | Antzinas et al. |
| 5,719,936 A | 2/1998 | Hillenmayer |

(Continued)

FOREIGN PATENT DOCUMENTS

| CN | 282599 | 8/1996 |
|---|---|---|
| EP | 0 932 861 | 8/1999 |
| EP | 0933908 A2 | 8/1999 |
| EP | 0933908 | 8/1999 |

(Continued)

OTHER PUBLICATIONS

Heintz, Todd, et al., U.S. Appl. No. 10/750,264; filing date: Dec. 31, 2003, "Electronic Device with Fold Out Display and/or Keyboard".

Winebrenner, Jon T., et al., U.S. Appl. No. 29/199,192; filing date: Feb. 9, 2004, "Electronic Communication Device".

(Continued)

*Primary Examiner*—Bipin Shalwala
*Assistant Examiner*—David L. Lewis
(74) *Attorney, Agent, or Firm*—Thelen Reid & Priest LLP

(57) ABSTRACT

An electronic device that has a lower portion that unfolds to reveal an extendable keyboard. When the keyboard is folded closed, a number pad is visible and the device looks similar to a traditional portable or cellular telephone. The device can be used as a personal digital assistant, a cellular telephone, a cordless telephone or as the handset of a traditional wire line telephone. The fold-out keyboard of the electronic device can be used for easy entry of text data while a communication channel is active. The device includes two way messaging and Internet browsing capabilities.

40 Claims, 10 Drawing Sheets

U.S. PATENT DOCUMENTS

| | | | |
|---|---|---|---|
| 5,742,894 A | | 4/1998 | Jambhekar et al. |
| 5,841,635 A | | 11/1998 | Sadler et al. |
| D402,572 S | | 12/1998 | Han |
| 5,943,055 A | * | 8/1999 | Sylvan ................. 379/201.04 |
| D416,256 S | | 11/1999 | Griffin et al. |
| 6,047,196 A | | 4/2000 | Makela et al. |
| D426,218 S | | 6/2000 | Abed et al. |
| 6,073,034 A | | 6/2000 | Jacobsen et al. |
| D432,511 S | | 10/2000 | Eckholm |
| D433,460 S | | 11/2000 | Griffin et al. |
| D435,248 S | | 12/2000 | Su |
| 6,167,251 A | | 12/2000 | Segal et al. |
| D436,102 S | | 1/2001 | Wu |
| 6,208,879 B1 | | 3/2001 | Iwata et al. |
| 6,223,059 B1 | | 4/2001 | Haestrup |
| 6,223,291 B1 | | 4/2001 | Puhl et al. |
| D441,733 S | | 5/2001 | Do et al. |
| D443,839 S | | 6/2001 | Brandenberg et al. |
| D446,512 S | | 8/2001 | Lee |
| 6,278,422 B1 | | 8/2001 | Ukai et al. |
| 6,297,945 B1 | | 10/2001 | Yamamoto |
| D451,079 S | | 11/2001 | Ali |
| D451,497 S | | 12/2001 | Wang et al. |
| D454,349 S | | 3/2002 | Makidera et al. |
| D455,137 S | | 4/2002 | Wang |
| D455,138 S | | 4/2002 | Wang |
| 6,370,018 B1 | | 4/2002 | Miller, Jr. et al. |
| D456,794 S | | 5/2002 | Laverick et al. |
| 6,389,267 B1 | | 5/2002 | Imai |
| D459,327 S | | 6/2002 | Ali |
| D460,493 S | | 7/2002 | Griffin et al. |
| 6,415,156 B1 | | 7/2002 | Stadelmann et al. |
| 6,452,588 B1 | | 9/2002 | Griffin et al. |
| 6,466,202 B1 | | 10/2002 | Suso et al. |
| 6,480,377 B1 | | 11/2002 | Genest et al. |
| 6,480,671 B1 | | 11/2002 | Takahashi et al. |
| D467,917 S | | 12/2002 | Tischer |
| 6,489,950 B1 | | 12/2002 | Griffin et al. |
| 6,493,560 B1 | | 12/2002 | Guan et al. |
| 6,507,727 B1 | | 1/2003 | Henrick |
| 6,510,325 B1 | | 1/2003 | Mack, II et al. |
| D469,749 S | | 2/2003 | Kim |
| D470,150 S | | 2/2003 | Lewis, Jr. et al. |
| D470,151 S | | 2/2003 | Lewis, Jr. et al. |
| D471,559 S | | 3/2003 | De Saulles |
| D472,551 S | | 4/2003 | Griffin |
| 6,567,677 B1 | | 5/2003 | Sokoloff |
| 6,571,086 B1 | * | 5/2003 | Uusimaki ................. 379/368 |
| 6,580,932 B1 | | 6/2003 | Finke-Anlauff |
| D477,596 S | | 7/2003 | Hayes |
| 6,587,675 B1 | | 7/2003 | Riddiford |
| D478,075 S | | 8/2003 | Hayes |
| D478,324 S | | 8/2003 | O'Neil |
| D478,882 S | | 8/2003 | Peng et al. |
| D478,883 S | | 8/2003 | Jensfelt et al. |
| D479,213 S | | 9/2003 | Ansley et al. |
| 6,628,508 B1 | | 9/2003 | Lieu et al. |
| 6,628,961 B1 | | 9/2003 | Ho et al. |
| D481,368 S | | 10/2003 | Helin |
| D481,710 S | | 11/2003 | Helin |
| D481,733 S | | 11/2003 | Pan et al. |
| 6,658,102 B1 | * | 12/2003 | Van Amerongen ..... 379/201.02 |
| 6,661,404 B1 | | 12/2003 | Sirola et al. |
| D487,066 S | | 2/2004 | Gartrell et al. |
| D488,453 S | | 4/2004 | Chang et al. |
| D488,465 S | | 4/2004 | Gartrell et al. |
| 6,748,248 B1 | | 6/2004 | Pan et al. |
| D496,642 S | | 9/2004 | Harries et al. |
| D496,655 S | | 9/2004 | Harries et al. |
| 6,798,882 B1 | * | 9/2004 | Kupiainen ............. 379/433.07 |
| 6,876,876 B1 | | 4/2005 | Uhlemann |
| 2001/0013645 A1 | | 10/2001 | Jarrett |
| 2001/0034222 A1 | | 10/2001 | Roustaei et al. |
| 2002/0051060 A1 | | 5/2002 | Wada |
| 2002/0072395 A1 | | 6/2002 | Miramontes |
| 2002/0190957 A1 | | 12/2002 | Lee et al. |
| 2003/0039503 A1 | | 2/2003 | Lin et al. |
| 2003/0043118 A1 | | 3/2003 | Lee |
| 2003/0054830 A1 | | 3/2003 | Williams et al. |
| 2003/0063070 A1 | | 4/2003 | Kang |
| 2003/0068183 A1 | | 4/2003 | Sabato |
| 2003/0073456 A1 | | 4/2003 | Griffin et al. |
| 2003/0073462 A1 | | 4/2003 | Zatloukal et al. |
| 2003/0078069 A1 | | 4/2003 | Lindeman |
| 2003/0081767 A1 | | 5/2003 | Montague |
| 2003/0124992 A1 | * | 7/2003 | Riddiford .................. 455/575 |
| 2003/0157957 A1 | | 8/2003 | Wendorff et al. |
| 2004/0147278 A1 | | 7/2004 | Miramontes |
| 2004/0198435 A1 | | 10/2004 | Gauld et al. |
| 2004/0203513 A1 | | 10/2004 | Kwon |
| 2004/0204074 A1 | | 10/2004 | Desai |
| 2004/0229663 A1 | | 11/2004 | Tosey et al. |
| 2005/0022117 A1 | * | 1/2005 | Vilcauskas et al. ......... 715/513 |

FOREIGN PATENT DOCUMENTS

| | | |
|---|---|---|
| EP | 1137239 A1 | 9/2001 |
| EP | 1 202 532 | 5/2002 |
| JP | 2001216078 | 8/2001 |
| JP | 2003289359 A | 10/2003 |
| WO | WO/96/23251 | 8/1996 |
| WO | 97/12470 | 4/1997 |
| WO | WO/98/19434 | 5/1998 |
| WO | WO98/19434 | 5/1998 |
| WO | WO/00/54479 | 9/2000 |
| WO | 01/84728 A1 | 11/2001 |
| WO | 03/028346 | 4/2003 |

OTHER PUBLICATIONS

Nokia 92101, Benutzerhanduch, http://ndsl.nokia.com/phones/files/guides/UG_de_oss3.pdf, retrieved on Apr. 8, 2004.

I. Scott Mackenzie, et al, "A Model of Two–Thumb Text Entry", Proceedings of Graphics Interface, 2002, pp 117–124, Toronto, Canada Information Processing Society, Canada.

I. Scott Mackenzie, et al, "Text Entry for Mobile Computing: Models and Methods, Theory and Practice", Human–Computer Interaction, 2002, pp 147–198.

clie_NX70V_web—Microsoft Internet Explorer, Sony PEG—NX07V.pdf, www.sony.com, printed May 2, 2003.

clie Personal Entertainment Organizer, 2003 Sony Electronics Inc., http://sonyelectronics.sonystyle.com/micros/clie/model/nx70v.html.

Samsung Electronics, Samsung SGH–V200.pdf, www.samsung.com, printed May 2, 2003.

* cited by examiner

MOBILE ELECTRONIC DEVICE

BACKGROUND OF THE INVENTION

The present invention relates generally to the field of telephones and more specifically to a telephone with an extendable keyboard.

A cellular telephone is designed to give the user maximum freedom of movement while using a telephone. A cellular telephone uses radio signals to communicate between the "cell phone" and a base station, via an antenna. The served area is divided into cells something like a honeycomb, and an antenna is placed within each cell and connected by telephone lines to one exchange devoted to cellular-telephone calls. This exchange connects cellular telephones to one another and transfers the call to a regular exchange, public switched telephone network, if the call is between a cellular telephone and a non-cellular telephone. The special cellular exchange, through computer control, selects the antenna closest to the telephone when service is requested. As the telephone roams, the exchange automatically determines when to change the serving cell based on the power of the radio signal received simultaneously at adjacent sites. This change occurs without interrupting conversation. Practical power considerations limit the distance between the telephone and the nearest cellular antenna, and since cellular phones use radio signals, it is possible for unauthorized people to access communications carried out over cellular phones. One of the reasons why digital cell phones have gained in popularity, besides being able to access the Internet, is because their radio signals are harder to intercept and decode.

Analog transmission, in which speech or data is converted directly into a varying electrical current, is suitable for local calls. But once the call involves any significant distance, the necessary amplification of the analog signal can add so much noise that the received signal becomes unintelligible. For long-distance calls, the signal is digitized, or converted to a series of pulses that encodes the information. When an analog electrical signal is digitized, samples of the signal's strength are taken at regular intervals, usually about 8000 samples per second. Each sample is converted into a binary form, a number made up of a series of 1s and 0s. This number is easily and swiftly passed through the switching system. Digital transmission systems are much less subject to interfering noise than are analog systems. The digitized signal can then be passed through a digital-to-analog converter (DAC) at a point close to the receiving party, and converted to a form that the ear cannot distinguish from the original signal. There are several ways a digital or analog signal may be transmitted, including coaxial and fiber-optic cables and microwave and longwave radio signals sent along the ground or bounced off satellites in orbit around the earth. A coaxial wire, like the wire between a videocassette recorder (VCR) and a television set, is an efficient transmission system. A coaxial wire has a conducting tube surrounding another conductor. A coaxial cable contains several coaxial wires in a common outer covering. The important benefit of a coaxial cable over a cable composed of simple wires is that the coaxial cable is more efficient at carrying very high frequency currents. This is important because in providing transmission over long distances, many telephone conversations are combined using frequency-modulation (FM) techniques similar to the combining of many channels in the television system. The combined signal containing hundreds of individual telephone conversations is sent over one pair of wires in a coaxial cable, so the signal has to be very clear.

Fiber optic cable offer another telephone-transmission method that uses bundles of optical fibers, long strands of specially made glass encased in a protective coating. Optical fibers transmit energy in the form of light pulses. The technology is similar to that of the coaxial cable, except that the optical fibers can handle tens of thousands of conversations simultaneously. Another approach to long-distance transmission is the use of radio. Before coaxial cables were invented, very powerful longwave (low frequency) radio stations were used for intercontinental calls. Microwave radio uses very high frequency radio waves and has the ability to handle a large number of simultaneous conversations over the same microwave link. Because cable does not have to be installed between microwave towers, this system is usually cheaper than coaxial cable. On land, the coaxial-cable systems are often supplemented with microwave-radio systems. The technology of microwave radio is carried one step further by the use of communications satellites. Most communications satellites are in geosynchronous orbit—that is, they orbit the earth once a day over the equator, so the satellite is always above the same place on the earth's surface. That way, only a single satellite is needed for continuous service between two points on the surface, provided both points can be seen from the satellite. A combination of microwave, coaxial-cable, optical-fiber, and satellite paths now link the major cities of the world. The capacity of each type of system depends on its age and the territory covered, but capacities generally fall into the following ranges: Frequency modulation over a simple pair of wires like the earliest telephone lines yields tens of circuits (a circuit can transmit one telephone conversation) per pair; coaxial cable yields hundreds of circuits per pair of conductors, and thousands per cable; microwave and satellite transmissions yield thousands of circuits per link; and optical fiber has the potential for tens of thousands of circuits per fiber.

Computer-controlled exchange switches make it possible to offer a variety of extra services to both the residential and the business customer. Some services to which users may subscribe at extra cost are call waiting, in which a second incoming call, instead of receiving a busy signal, hears normal ringing while the subscriber hears a beep superimposed on the conversation in progress; and three-way calling, in which a second outgoing call may be placed while one is already in progress so that three subscribers can then talk to each other. Other services available to users are: caller ID, in which the calling party's number is displayed to the receiver on special equipment before the call is answered; and repeat dialing, in which a called number, if busy, will be automatically redialed for a certain amount of time. Of course users have the ability to block their name and phone from being displayed on a caller ID display. Another popular service is voice mail. While traditional answering machines cannot take a message if a caller is already on the line, voice mail creates a second virtual line. While a caller is talking to one party, a second incoming call is greeted with a message asking the second party to leave a message. The user will then be notified of the waiting message.

Unified messaging and the arrival of mobile Internet services means Short Message Service (SMS), a mobile messaging service, will soon become the primary alert mechanism for users to check and pick up their e-mail, fax or voice messages. Enhanced Message Service (EMS), Instant Messaging (ICQ), and Multimedia Message Service (MMS) message protocols can be expected to grow in popularity in the future. The rapidly growing availability of WAP (Wireless Application Protocol) has enabled handsets to enhance the customer experience of reading and sending more messages. The arrival of the GSM (Global System for Mobile communications) family's next phase of evolution in the form of GPRS (General Packet Radio Services) will ensure faster speeds and boost the variety of mobile services available significantly. Mobile banking, M-Commerce, and customer service applications are also bolstering SMS traffic. The arrival of more advanced data services will yet again increase demand. During the First (1 G) and Second (2 G) Generations of mobile communications different regions of the world pursued different mobile phone standards. Europe pursued NMT and TACS for analog and GSM for digital. North America pursued AMPS for analog and a mix of TDMA, CDMA and GSM for digital. The Third Generation (3 G), based on CDMA technology, will bring these incompatible standards together and allow convergence toward a common standard for mobile multimedia.

It is an object of the present invention to enrich the user's experience of the mobile Internet by facilitating efficient text entry. As mobile phones and computers converge towards unified handheld communication and computing devices, text messaging is becoming one of many ways in which text entry on handheld devices will be employed. Text entry is an integral part of the way users interact with computers in general and the Internet in particular. Simple text entry is required to query search engines, to find contacts in a phone list, to send email or instant messages and to enter commands. The inadequacy of currently used methods for entering text is the major obstacle inhibiting the growth of a wireless web and other applications, such as, Microsoft's Pocket Word and Pocket Excel. A numeric keypad such as that found in most cellular devices is poor device for entering strings of text data. For example, to enter certain letters a user must strike a key three times. A QWERTY-style keyboard on a mobile device is needed to provide an easy to use and familiar text entry solution. Such a device will help the mobile Internet achieve its full commercial potential for communication of all forms including voice, text and multimedia.

Currently researchers are studying keyboard design, and the following reference papers are examples. MacKenzie, S. I., Soukoreff, R. W., "Text entry for mobile computing: Models and Methods, Theory and Practice", (in press) Human-Computer Interaction. Source: http://www.yorku.ca/mack/hci3.html. MacKenzie, S. I., Soukoreff, R, W., "A model of two-thumb text entry", Proceedings of Graphics Interface 2002, pp 117–124. Toronto: Canadian Information Processing Society. Source http://www.yorku.ca/mack/gi2002.html.

Current devices for entering text on a mobile electronic device do not facilitate the use of the keys by the user. In many cases the keys are configured in less than optimum ways, with regard to position, location or key shape. It is an object of the present invention to overcome these problems.

An important feature of the present hand held electrical device is that data input through an extendable keyboard works in conjunction with launching and using wireless applications such as SMS, E-mail and web surfing, as well as an enter-then-act device user interaction paradigm. An enter-then-act device is disclosed in U.S. patent application titled "Enter-Then-Act Input Handling" Ser. No. 10/165,598, filed Jun. 7, 2002, which is incorporated herein by this reference.

Current mobile devices can provide a user with at least three separate user interfaces: a first user interface for voice use, a second user interface for handset dialing and a third user interface for wireless text or email messaging, software and wireless data applications. Prior solutions have attempted to address the various user interface needs for convergent mobile devices supporting voice, data and text operation. The prior art solutions are typically awkward to use, often requiring new and unintuitive methods of operation, particularly when supporting both voice and text entry operation.

One solution provides a QWERTY-style keyboard with numeric keys. Number entry is supported via a row of buttons. Unfortunately, this user interface is nonintuitive for users accustomed to standard phone functionality.

Another solution presents to the user two completely distinct interfaces: a 12-key dial-pad and a QWERTY-style keyboard. This solution also provides two separate displays. A 12-key dial-pad and a first display is provided for traditional handset use, and a QWERTY-style keyboard is provided with a second display for operation with the QWERTY-style keyboard. Unfortunately, the inclusion of a second display results in a relatively large device. Additionally, switching between use modes is awkward.

It is another object of this invention to provide a relatively intuitive user interface both for text entry mode and for voice calling mode in a compact mobile communications device. Another object is to provide for a simplified transition between use modes.

SUMMARY OF THE INVENTION

An electronic device is provided for telephonic and data communications. In this case "telephonic" should be understood to mean voice communication and "data" should be understood to mean alphanumeric, such as text, and other information which can be entered by typing as well as digital and graphical information which can be drawings, pictures, etc. The present device is hand held and provides a user with text messaging and voice communications. The device comprises: a display screen for displaying text and graphical information, such as icons, pictures and video, to the user. At least one speaker is provided for transmitting audio information, such as voice and music, to the user. Navigational buttons control basic functions of the device, such as on/off, initiation and termination of a telephone call, and selection and activation of icons or other data displayed on the display screen. A number pad allows the user to input numeric and text data wherein the number pad is a primary input device of telephone number data. At least one microphone is provided for receiving audio data, such as voice, from the user. Device software provides a graphical user interface for the device and controls operation of hardware provided in the device. A communication, control and memory system provides for transmission and reception of all data, voice, video, music and text from and to the device. A fold out section comprising approximately half of the portion of the device underneath the number pad unfolds in a direction perpendicular to a length of the device to reveal an extendable keyboard contained underneath the number pad. The extendable keyboard is usable with software applications on the device and provides the user with the ability to easily enter alphanumeric data and transmit the data over a wireless network.

The device can be used as a cellular telephone wherein the communication control unit includes an antenna that facilitates communication with a cellular base station. The device can also be used as a portable telephone in which case the communication control unit would include an antenna that facilitates communication with a portable telephone base that is connected, via a telephone line, to a public switched telephone network. The user can type on keys of the extendable keyboard to enter data and transmit the data from the device while a communication channel is open to a remote network. Capabilities of the device include the use of short messaging service (SMS) and similar services such as enhanced messaging service (EMS), multimedia messaging service (MMS), instant messaging (IM), picture messaging and text chat, as well as receiving and inputting data from and to the Internet via a mobile browser, and wireless data transmission applications that are compatible with SIM Application Toolkit and Wireless Application Protocol (WAP). The device can also include a small built in camera that allows pictures and short videos to be sent from the device. Predictive text software is also provided and may be used when the device is in the open and closed positions.

The keys comprising the extendable keyboard are designed to facilitate typing. The keys are substantially parallelogram shaped, and most of the keys are substantially rhombus shaped to enable the keys to fit in the limited space of the extendable keyboard while permitting the maximum area of each key to be contacted by a user's thumb. The keys present the user with the optimum amount of surface area for contact with the user's thumb tip.

BRIEF DESCRIPTION OF THE DRAWINGS

The invention of the present application will now be described in more detail with reference to the accompanying drawings, given only by way of example, in which.

DETAILED DESCRIPTION OF THE INVENTION

Figure 1:
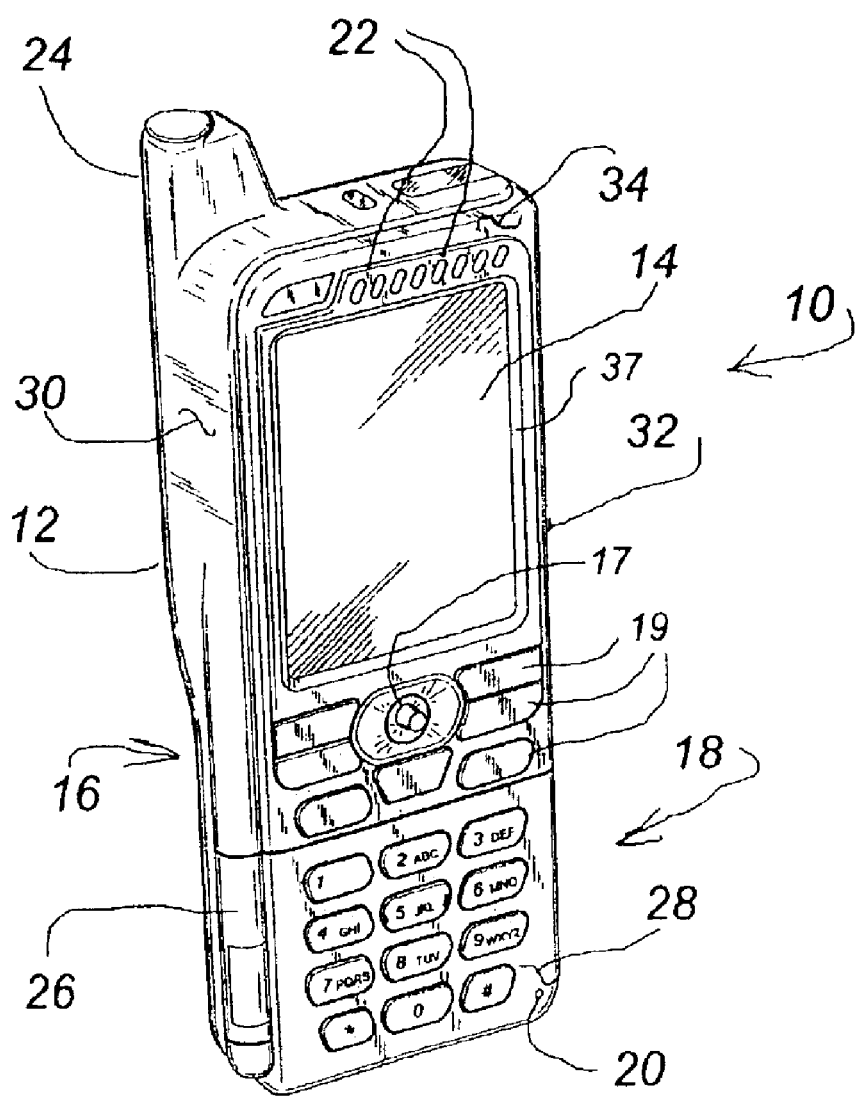
FIG. 1 is an isometric front view of a preferred embodiment in the closed position.

FIG. 1 shows a front view of a preferred embodiment wherein the extendable keyboard is folded closed and hidden underneath number pad 5. Electronic device 10 comprises housing 12, display 14, navigational pad 16, numeric keyboard 18, microphone 20, speaker 22, and antenna 24.

The housing 12 is generally rectangular and has a left side 30, a right side 32, a front 34 and a back, which is not shown in this Figure. A hinge 26 is connected to the housing 12 and to a panel 28 comprising an extendable keyboard. The navigational pad 16 includes a joystick 17 and a plurality of navigation keys 19 which allow the user to perform certain functions on the display 14, including moving a cursor on the display. The joystick 17 and the navigation keys 19 can be considered to be pointing devices.

Display 14 provides visual output to the user. A display backlight 37 located around the periphery of the display 14 provides backlighting for use of the device at night. Display output can be text and graphics; icons, pictures, and videos. Navigational pad 16 allows the user to select options on a menu and activate various software programs, such as telephone and text communications enabling programs, which are loaded within device 10. The navigational pad 16 is configured similar to that of a conventional cellular telephone.

Numeric keyboard 18 is substantially the same as traditional cellular or wire line telephone number pad. The numbers 0–9 are typically represented on a 3×4 keypad matrix with the star symbol, zero and the # symbol residing on the bottom row of the matrix although the exact placement of these keys in this matrix fashion is not required. Alternative placements of these keys on the front surface can be accommodated. The well known standard of three, or four, letters being represented on the number pads of 0 and 2–9 are included in the numeric keyboard 18. Microphone 20 is used to accept voice data from the user. Speaker 22 provides audio output to the user, and a speakerphone may also be supported. Antenna 24 is used for radio communication between device 10 and a remote location such as a cellular telephone base station. Of course, if device 10 is used as the handset of a traditional wire line phone, then no antenna is required.

Figure 2:
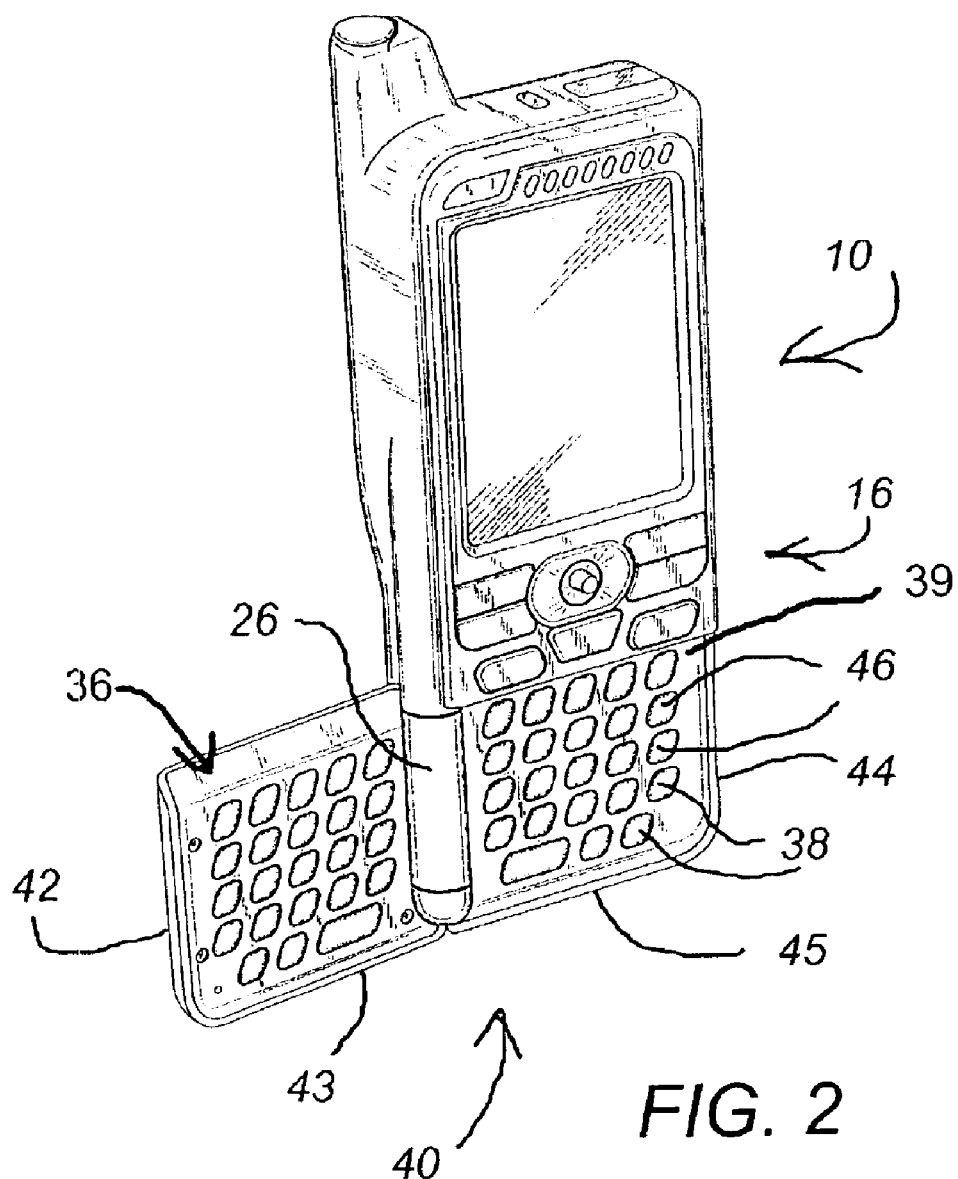
FIG. 2 is an isometric front view of a preferred embodiment in the open position.

FIG. 2 shows electronic device 10 in the open position. The device 10 includes an extendable keyboard 40 which includes two sections, a left section 42 and a right section 44 which are coupled together by hinge 26. The left and right sections 42 and 44 have lower faces 43 and 45 which are in the same plane with each other when the device is in the open position. The keyboard includes a plurality of keys 46 which for the purpose of clarity are shown without their labels, which will be discussed further in connection with FIG. 3. The keys 46 are translucent, and a keyboard backlight system 38 is provided to light the keys in certain circumstances.

As shown in FIG. 2 the extendable keyboard 40 is in the open position and ready to receive keystrokes. In other words, the user has converted the device 10 from the configuration shown in FIG. 1 to the configuration shown in FIG. 2 by lifting the right side of the left section 42 so that it rotates about the hinge 26 and locks in the position shown in FIG. 2. A sensor 36 capable of sensing a magnetic field is located inside the left section 42 to sense whether the panel 28 is open or closed. A magnet 39 is located inside the right section 44 in a location which is adjacent the sensor 36 when the panel is closed. Still visible and ready for use while device 10 is in the open position are display 14, navigational pad 16, microphone 20, speaker 22, and antenna 24. The numeric keyboard 18 is not visible on the front of the device; it is on the opposite side of the folded out portion, i.e., behind the left section 42 of the keyboard 40. In this case the numeric keyboard 18 is not easily accessible to the user, but it is not necessary for it to be easily accessible since in this configuration the user uses the extendable keyboard 40 for data entry.

It should be understood that the hinge 26 could be located in other positions on the device to permit the keyboard to be folded in different ways. For example, the hinge 26 could be located on the right side of the device 10 so that the folded portion of the keyboard folds to the right side of the device rather than to the left side, as shown in FIG. 2.

Figure 3:
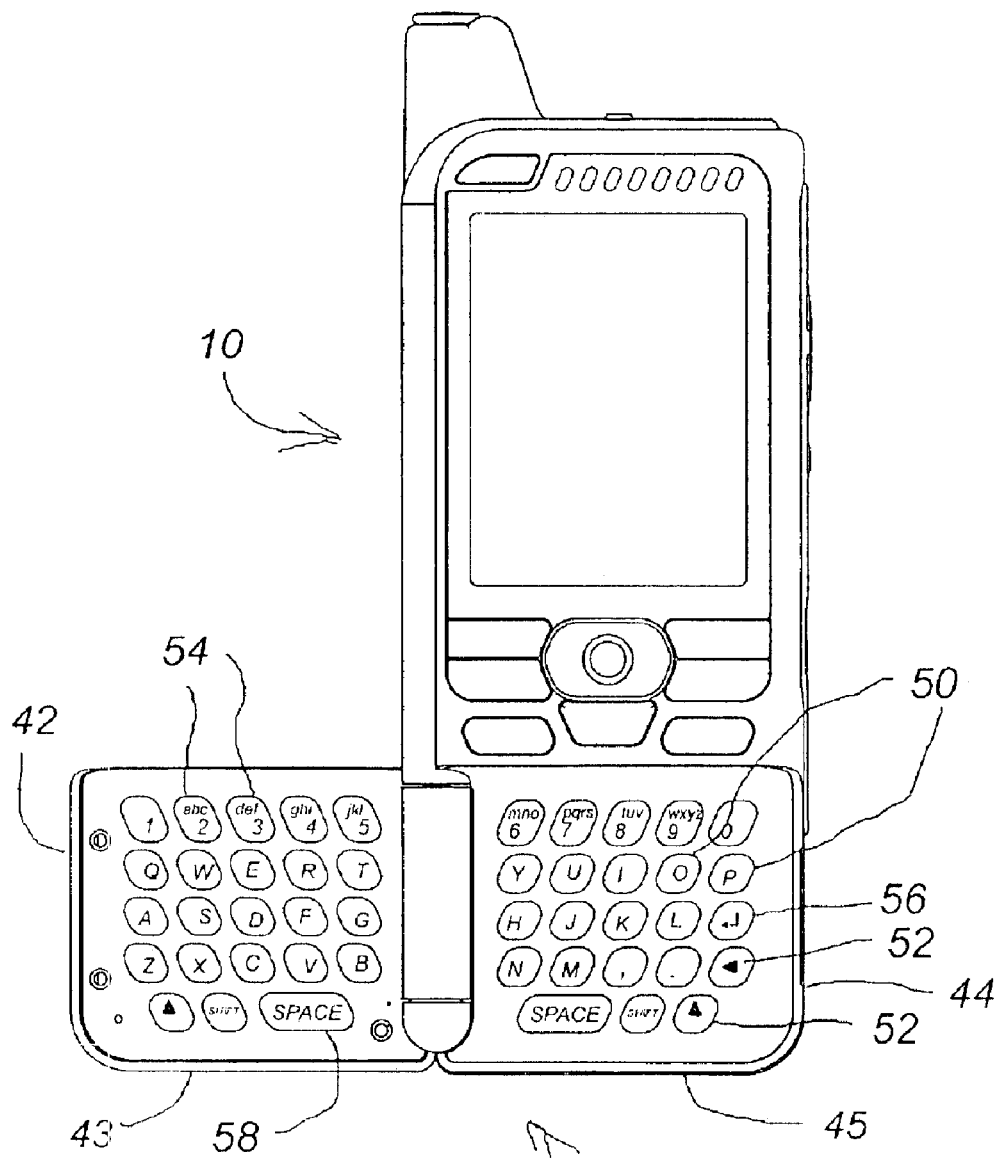
FIG. 3 is a front view of another preferred embodiment in the open position.

Turning now to FIG. 3, an alternative embodiment of the keyboard 40 is shown, and the primary labels used on the keys 46 are shown. Alternatively, other labeling could be used. The keyboard 40 includes a plurality of letter keys 50, control keys 52, and letter and number keys 54, all of which the user can strike to enter data. Twenty-six letter keys 50 are shown, one for each letter of the alphabet, in the configuration commonly known as a "qwerty-style" keyboard. It should be understood that other alphanumeric keys could also be used, such as keys exclusively for numbers or keys which can be used for both letters and numbers. The control keys 52 are for such typing and computer functions as space and carriage return, and other common computer-related control functions could also be assigned keys. One of the control keys, shown in this embodiment, contains the "return" key 56. This key can be used as a carriage return to break up lines of text, for a new paragraph for example, during text messaging. It may also be used as an "enter" button to select and activate a program. Another control key is the "space" key 58 that will commonly be required in text messaging. The letter and number keys 54 each provide two functions. These ten keys can act as the numbers 0–9, when a function key or icon is pressed or selected. Alternatively the letter and number keys 54 can be used to type letters in a mode similar to the operation of the numeric keyboard 18.

It should be noted that the shapes of the keys are designed to facilitate typing on the relatively small keyboard of the present device 10. The keys are arranged in two sections, a top section comprising the letter and number keys 54 and a bottom section comprising control keys 52 and letter keys 50. The letter and number keys 54 are substantially parallelogram shaped, and the letter keys are substantially rhombus shaped, as will be discussed further below.

Figure 4:
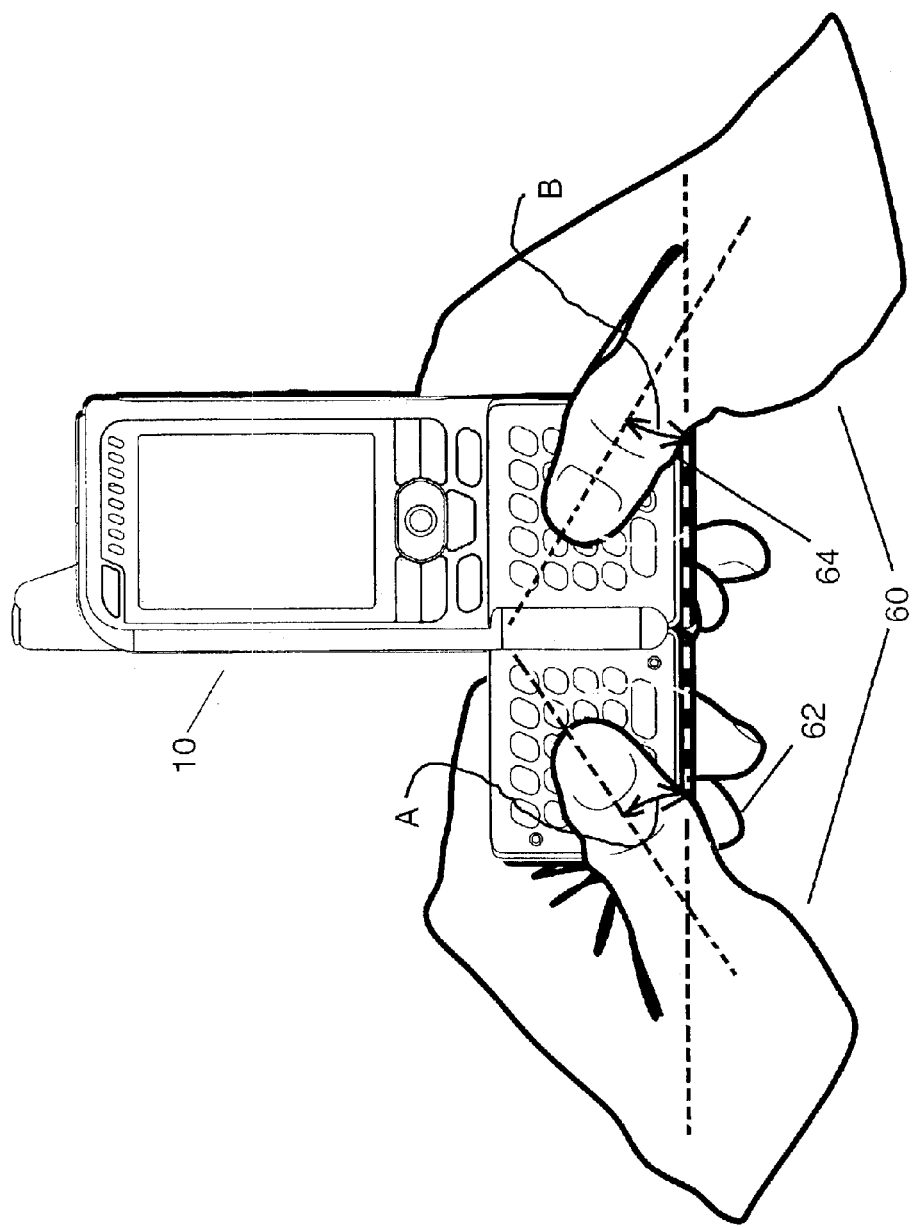
FIG. 4 is a view of the device shown in FIG. 3 as operated by a user.

Turning now to FIG. 4, the Figure shows the device 10 in use as one frequently holds the device. It can be seen that the user grasps the right side of device 10 with the right hand and the left section 42 with the left hand and strikes the keys with the tips of the thumbs 62 and 64. It should be noted that the user's hands 60 are oriented so that left and right thumbs 62 and 64, respectively, have their axes oriented about 30 degrees from the lower faces 43 and 45 of the left and light sections 42 and 44, respectively. The angles are shown as A and B, which are measured from the dashed lines wherein two dashed lines show the axes of the thumbs and the horizontal dashed line is coincident with the lower faces 43 and 45.

Figure 5:
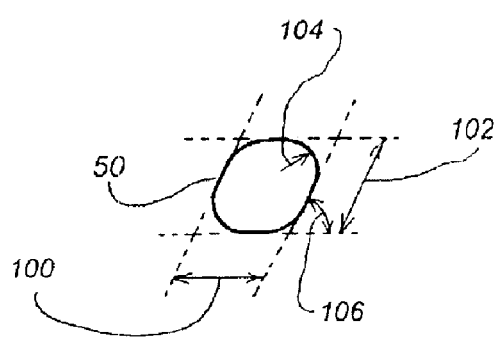
FIGS. 5 through 10 are details of keys of the devices shown in FIGS. 1–4.
Figure 6:
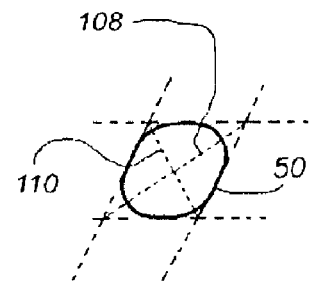

Turning now to FIGS. 5–10 there are shown details of the keys, it being understood that the dashed lines are for the purpose of showing dimensions and do not illustrate part of the keys. FIGS. 5 and 6 show one of the letter keys 50, and the letter keys 50 are substantially rhombus shaped. Geometrically, a rhombus is defined as follows: A rhombus is a quadrilateral with four congruent sides. A rhombus is that which is equilateral but not right-angled (unlike an oblong, that which is right-angled but not equilateral). Each diagonal of a rhombus bisects a pair of opposite angles. The diagonals of a rhombs are perpendicular. A rhombus is a special type of parallelogram. A parallelogram is defined as follows: A parallelogram is a quadrilateral with both pairs of opposite sides parallel. Opposite sides of a parallelogram are congruent. Opposite angles of a parallelogram are congruent. The diagonals of a parallelogram bisect each other. Consecutive angles in a parallelogram are supplementary.

In the preferred embodiment the length 100 of the key in the horizontal dimension is equal to the length 102 of the key in the angled dimension, which is about 0.22 inch. Dimension 104 is the radius of the circle forming the rounded corner of the substantially rhombus shaped key. Preferably dimension 104 is about 0.07 inch. The angle 106 between the horizontal face of the key and the angled face of the key is preferably about 66 degrees.

FIG. 6 shows the lengths of the long dimension 108 and the short dimension 110 of the key 50. Preferably the long dimension is about 0.36 inch and the short dimension is about 0.23 inch. It should be understood that the long and short dimensions are measured from one curved edge of the key to another curved edge, and not from the vertexes formed by the dashed dimension lines.

Figure 7:
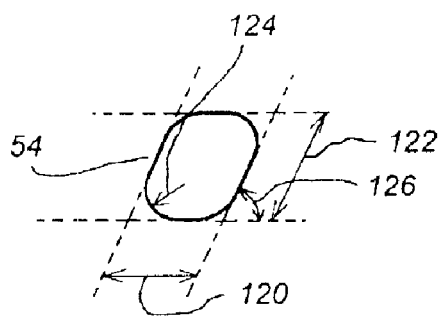
Figure 8:
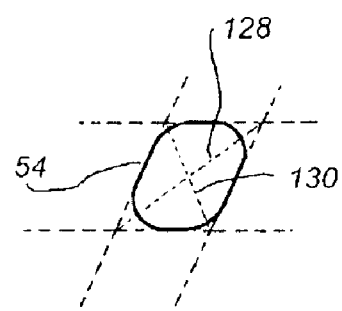

FIGS. 7 and 8 show one of the letter and number keys 54, and the keys shown in FIGS. 7 and 8 are substantially parallelogram shaped. Geometrically, a parallelogram is defined to be a quadrilateral with both pairs of opposite sides of equal length. (It should be noted that rhombuses are a subset of parallelograms.) In the preferred embodiment the length 120 of the key in the horizontal dimension is about 0.19 inch, and the length 122 of the key in the angled dimension, is about 0.22 inch. Dimension 124 is the radius of the circle forming the rounded corner of the substantially rhombus shaped key. Preferably dimension 124 is about 0.05 inch. The angle 126 between the horizontal face of the key and the angled face of the key is preferably about 67 degrees.

FIG. 8 shows the lengths of the long dimension 128 and the short dimension 130 of the key. Preferably the long dimension is about 0.37 inch and the short dimension is about 0.24 inch. It should be understood that the long and short dimensions are measured from one curved edge of the key to another curved edge, and not from the vertexes formed by the dashed dimension lines.

Figure 9:
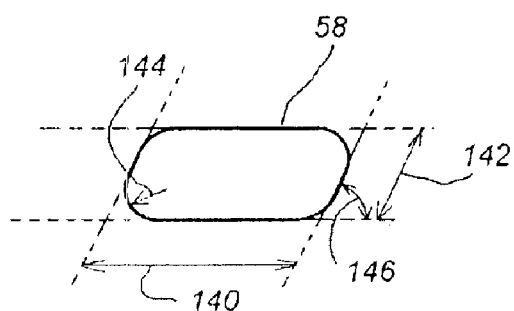
Figure 10:
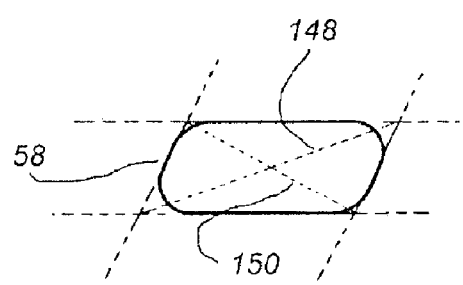

FIGS. 9 and 10 show one of the space keys 58. The keys shown in FIGS. 9 and 10 are substantially parallelogram shaped. In the preferred embodiment the length 140 of the key in the horizontal dimension is about 0.43 inch, and the length 142 of the key in the angled dimension, is about 0.20 inch. Dimension 144 is the radius of the circle forming the rounded corner of the substantially rhombus shaped key. Preferably dimension 144 is about 0.07 inch. The angle 146 between the horizontal face of the key and the angled face of the key is preferably about 65.5 degrees.

FIG. 10 shows the lengths of the long dimension 148 and the short dimension 150 of the key. Preferably the long dimension is about 0.59 inch and the short dimension is about 0.43 inch. It should be understood that the long and short dimensions are measured from one curved edge of the key to another curved edge, and not from the vertexes formed by the dashed dimension lines.

It should be recognized that the keys 50, 52 and 54 are specifically designed to facilitate typing. The extendable keyboard is considerably smaller than a desk top computer keyboard; specifically, the extendable keyboard 40 is about 1.62 inches by about 3.78 inches. Therefore each key must be significantly smaller than a key of a computer keyboard. Of course, as keys are made smaller they can become difficult for a user to easily and correctly strike.

We have found that it is important to provide the maximum surface area for a user to make contact with the keys in order to facilitate typing. Of course, the keys of our device must also all fit within the limited dimensions of our extendable keyboard. Accordingly, we have designed our keys 50, 52 and 54 to provide the user the maximum surface area in the dimension which corresponds to the user's thumb tips. Our keys are substantially parallelogram shaped, and our QWERTY-style keys are substantially rhombus shaped to enable the keys to fit in the limited space of our extendable keyboard while permitting the maximum area of each key to be contacted by a user's thumb. When a user enters text with his/her thumbs, the thumbs are oriented with their axes about 30 degrees from the lower faces 43 and 45 of the extendable keyboard 40. We have found that when the axis of a user's thumb is oriented perpendicular to the long dimension of one of our keys then the tip of the thumb contacts the key with the maximum surface area. Thus in the embodiment shown in FIG. 3 our keys have their long dimension oriented perpendicular to the axes of the thumbs, that is, their long dimension is about 60 degrees from the lower face. In this way the keys present the user with the optimum amount of surface area for contact with the thumb tip.

Although we have found that many users hold the device 10 as shown in FIG. 4 and strike the keys with their thumb tips, some users grasp the device with one hand and strike the keys with the tip of a single finger. In this situation the user's finger is oriented in substantially the same direction with respect to the keys of both the left and right sections 42 and 44. To accommodate such users the keys are oriented as shown in FIG. 2. That is, the keys on the left section 42 are oriented with their long dimensions parallel to the long dimensions of the keys comprising the right section 44.

The present device is intended to ease the typing burden on users that take advantage of cost efficient messaging services such as SMS. The Short Message Service (SMS) is the ability to send and receive text messages to and from mobile telephones. The text can comprise of words or numbers or an alphanumeric combination. SMS was created as part of the GSM Phase 1 standard. Each short message is up to 160 characters in length when Latin alphabets are used, and 70 characters in length when non-Latin alphabets such as Arabic and Chinese are used.

In operation, a network operator launches SMS Mobile Originate, software executed at base stations, to give customer true two-way SMS capability. Customers experiment with the service and work out new uses for it. Addition of a wireless Internet/mobile email service often follows, typically with the customer's mobile number becoming part of the email address they are allocated as part of the service. Emails sent to that address are forwarded as a short message to their wireless phone. Such a service tends to be popular with customers that don't already have an email address. Other information services are available. These services typically start with mainstream content such as news, travel, weather and sports.

The introduction of standardized protocols such as SIM Application Toolkit and the Wireless Application Protocol (WAP) have contributed to an increase in messaging usage by providing a standard service development and deployment environment for application developers and business partners. These protocols also make it easier for users to reply to and otherwise access messaging services through the provision of custom menus on the phone. The introduction of more friendly and easy to use terminals, such as device 10, will contribute to increases in messaging usage by providing simpler access to messaging services.

Mobile phone users sometimes prefer to communicate with each other using the Short Message Service. Typically, such person to person messaging is used to say hello or prompt someone for information or arrange a meeting or pass on some information. Such messages are usually originated from the mobile phone keypad. When the information to be communicated is short or it would take too long to have a full conversation or someone is traveling overseas or not available to take a voice call, SMS is an ideal messaging medium. For example, network operators typically charge the same to send a short message to someone in the same room as they do to someone traveling overseas with their mobile phone.

Because short messages are proactively delivered to mobile phones that are typically kept in the user's pocket and can be stored for later reference, SMS is often more convenient than email to communicate amongst distributed and mobile groups of people. Once users have familiarized themselves with reading and sending short messages, they often find that SMS is a useful way of exchanging information and keeping in touch with friends. This is particularly so when the recipient is also able to reply to messages for two-way communication. Simple person to person messaging generates a high volume of short messages. The most common use of SMS is for notifying mobile phone users that they have new voice or fax mail messages waiting. This is therefore the starting point for most mobile network operators and the first time that mobile phone users use SMS.

Whenever a new message is dispatched into the mailbox, an alert by SMS informs the user of this fact. Because SMS is already routinely used to alert users of new voice mail messages, this application may become one of the largest generators of short messages. Unified messaging is an emerging value-added network service that is particularly compelling because it elevates communication above the technology used to communicate; the message takes precedence over the media. The traditional message collection method is difficult to manage considering all of the different kinds of messages that people get; users have to log-on and pick up emails, pick up their faxes from the fax machine, call in and listen to voice mail and so on. Unified messaging involves providing a single interface for people to access the various different kinds of messaging they use such as fax, voice mail, short messages, and email. Now all of these types of messages can be conveniently accessed from a single point in the most actionable form. The user typically receives a short message notifying them that they have a new message in their unified messaging box. The short message often also includes an indication of the type of new message that has been deposited, such as fax, email or voice mail.

Unified messaging is a convenient application that is likely to become mainstream in the future. It should therefore be a significant generator of short messages as more services are launched. Upon receiving a new email in their mailbox, most Internet email users do not get notified of this fact. They have to dial in speculatively and periodically to check their mailbox contents. However, by linking Internet email with SMS, users can be notified whenever a new email is received. The Internet email alert is provided in the form of a short message that typically details the sender of the email, the subject field and first few words of the email message. Most of the mobile Internet email solutions incorporate filtering, such that users are only notified of certain messages with user-defined keywords in the subject field or from certain senders. Users could find it expensive or inconvenient to be alerted about every email they receive (including unsolicited "spam" emails), which would reduce the value of the service. Because of the high and increasing usage of Internet email to communicate globally, and the benefit from using SMS to notify mobile users about important new email messages, this is likely to be a fast growing and popular application for SMS.

Another emerging SMS-based application is downloading ringtones. Ringtones are the tunes that the phone plays when someone calls it. With the same phone often sold with the same default tune, it is important for phone users to be able to change their ringtone to distinguish it from others. Phones often come with a range of different ringtones built into the phone's memory that the users can choose from. However, it has become popular to download new ringtones from an Internet site to the phone—these phones tend to be popular television or film theme tunes. Ringtone composers are also popular because they allow mobile phone users to compose their own unique ringtones and download them to their phones.

The Short Message Service can be used to deliver a wide range of information to mobile phone users from share prices, sports scores, weather, flight information, news headlines, lottery results, jokes to horoscopes. Essentially, any information that fits into a short message can be delivered by SMS. Information services can therefore be configured as push-based and from a public or private source or pull-based and from a public or private source. An information service for an affinity program may combine public information such as share prices with private information from bank databases. Successful information services should be simple to use, timely, personalized and localized.

Electronic commerce applications involve using an electrical device such as a mobile phone for financial transaction purposes. This usually means making a payment for goods or transferring funds electronically. Transferring money between accounts and paying for purchases are extremely popular electronic commerce applications. The convenience of paying for purchases using SMS must be weighed against the related issues of security, integration with the retail and banking hardware and systems, and money transfer issues. However, this area of electronic commerce applications is expected to contribute significantly to the growing amount of SMS traffic. The cellular telephone embodiment of the present device is tailored toward taking advantage of all of the above features of SMS by providing an extendable keyboard for text entry.

Figure 11:
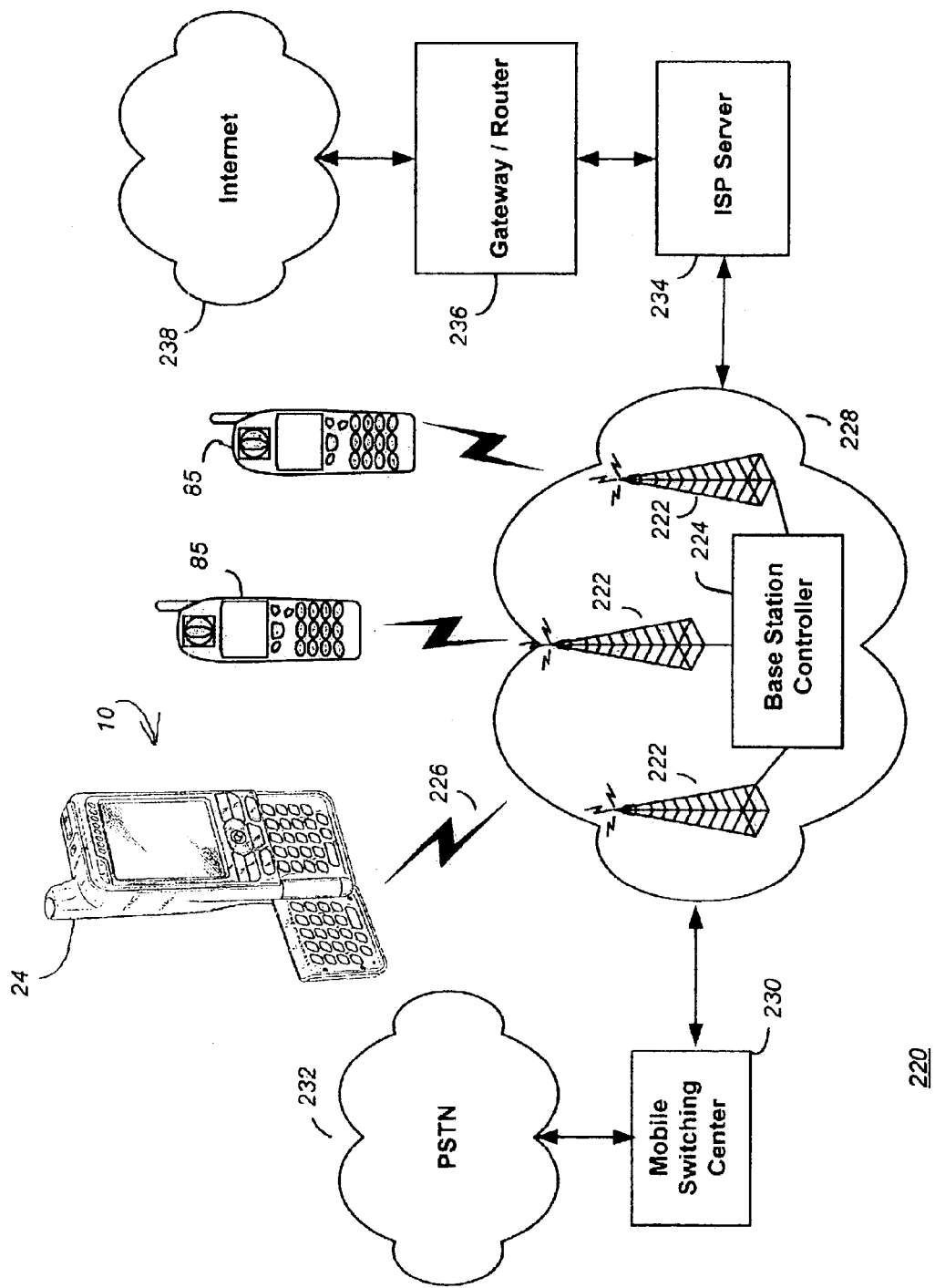
FIG. 11 is a schematic illustration showing how the present device functions as part of a wireless communication network.

FIG. 11 illustrates how device 10 may be configured in a wireless communications system 220 to communicate both voice and data to a remote electronic device. According to embodiments of the present invention, a user may utilize the extendable keyboard 40 of device 10 to send data over the Internet to a remote device or directly to a hand-held electronic device over a network 228. Antenna 24 of device 10 transmits and receives RF signals modulated by data and voice information to and from one of base stations 222 over a wireless link 226 to wireless network 228. Base station controller 81 transmits and receives voice modulated signals to and from a mobile switching center 224, which communicates with a remote device (e.g. a telephone) over the PSTN (Public Switched Telephone Network) 232. Base station controller 224 also transmits and receives data modulated signals to and from an ISP (Internet Service Provider) Server 234. ISP server 234 transmits and receives data to and from a gateway/router 236, which sends and receives the data to and from a remote device over the Internet 238 using, for example, Session Initiated Protocol (SIP). Data entered from keyboard 40 of device 10 may also be transmitted by antenna 24, over wireless network 228, to a remote handheld electronic device 85 using the SMS, SIM, WAP protocols, or the like. Wireless network 228 may comprise any circuit-switched network, any connectionless packet-switched signaling network, any two-way paging network, and may support cellular technologies such as, for example, PCS, GSM (global System for Global Communication), GPRS (General Packet Radio Service), CDMA (Code Division Multiple Access), TDMA (Time Division Multiple Access), or W-CDMA (Wideband Code Division Multiple Access). The communication, control and memory means 204 of the present device can establish a connection through a communication channel using circuit switched or packet switched means or other, similar means. It should be understood that the wireless network 228 can include short range wireless technologies such as Bluetooth or others which include wireless lan 802.11b, 802.11a, 802.11g, infrared, and ultrawideband.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

Figure 12:
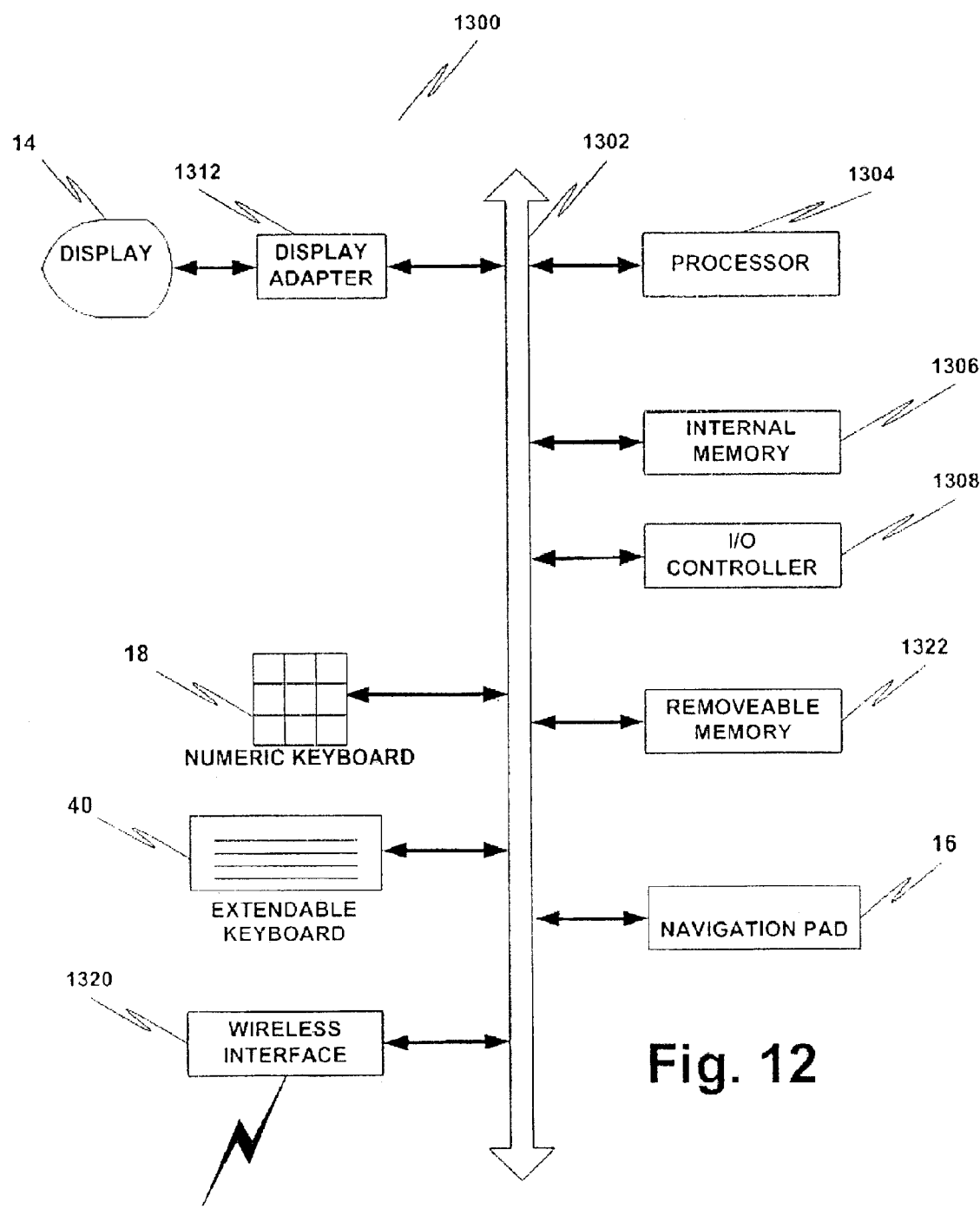
FIG. 12 is a block diagram of a system suitable for implementing aspects of the present invention.

FIG. 12 depicts a block diagram of a system 1300 suitable for implementing aspects of the present invention. As shown in FIG. 12, system 1300 includes a bus 1302 which interconnects major subsystems comprising a processor 1304, an internal memory 1306 (such as a RAM), an input/output (I/O) controller 1308, a removable memory (such as a memory card),not shown, the display 14 via display adapter 1312, the navigational pad 16, the numeric keyboard 18, the extendable, alphanumeric keyboard 40, and a wireless interface 1320. Wireless interface 1320 may be used to interface to a local or wide area network (such as the Internet) as discussed in connection with FIG. 11. Code to implement the present invention may be operably disposed in internal memory 1306 or stored on storage media such as removable memory 1322.

As discussed above, sensor 36 determines whether the panel 28 is in an open or closed position. The sensor 36 is communicatively coupled to a processor or central control unit (reference numeral 1304 of FIG. 12) configured to execute one or more application programs based at least in part on whether the mobile device panel 28 is in the open or closed position.

According to one embodiment of the present invention, the execution of and display mode of a predetermined application program is based at least in part on whether the mobile device panel 28 is in the open or closed position. The execution and display mode of the predetermined application program is also based at least in part on whether another user application program is currently executing. Exemplary user application programs include a Web browser application program, an email application program, an SMS messaging application program and a game application program. The position of the panel 28 does not affect the execution of other user programs. But if other user programs are not currently executing, the position of the panel is used to determine the execution and display mode of the predetermined application program. The predetermined application program may be a text entry mode application program for when the panel is in the open position. This is explained below in more detail with reference to FIG. 13.

Figure 13:
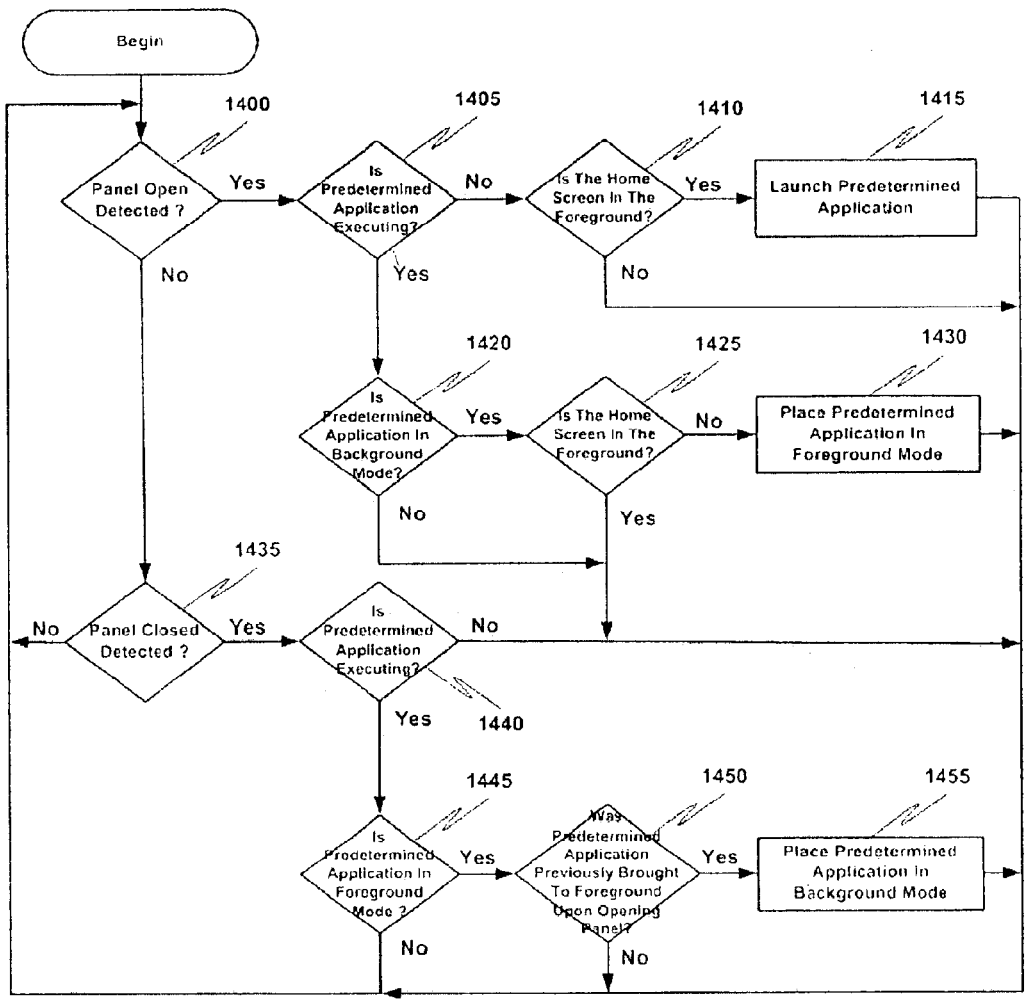
FIG. 13 is a flow diagram that illustrates a method for inputting characters on a communications device in accordance with one embodiment of the present invention.

Turning now to FIG. 13, a flow diagram that illustrates a method for inputting characters on a communications device in accordance with one embodiment of the present invention is presented. At 1400, the sensor 28 determines whether the panel 28 is in the open position. If the panel is in the open position, at 1405 a determination is made regarding whether a predetermined application is currently executing. If the predetermined application is not currently executing, at 1410 a determination is made regarding whether a "home" screen, "status" screen, or the like is in the foreground on display 14. If the home screen is in the foreground, the predetermined application is launched at 1415. If at 1405 the predetermined application is not currently executing, at 1420 a determination is made regarding whether the predetermined application is currently executing in a background mode. If the program is currently executing in a background mode, at 1425 a determination is made regarding whether the home screen, "status" screen, or the like is in the foreground. If the home screen is in the foreground, at 1430 the predetermined application is placed in a foreground mode.

According to one embodiment of the present invention, the communications device is configured to turn on a screen backlight 37 and one or more keyboard backlights 38 when the opening of the panel is detected. Detecting the opening of the panel may trigger other events as well.

Still referring to FIG. 13, at 1435 the sensor 36 determines whether the panel 28 is in the closed position. If the panel is in the closed position, at 1440 a determination is made regarding whether the predetermined application is executing. If the predetermined application is executing, at 1445 a determination is made regarding whether the predetermined application is in foreground mode. If the predetermined application is in foreground mode, at 1450 a determination is made regarding whether the predetermined application was previously brought to the foreground upon opening the panel. If the predetermined application was previously brought to the foreground upon opening the panel, at 1455 the predetermined application is placed in a background mode.

According to one embodiment of the present invention, the communications device is configured to turn off the display backlight 37 and one or more keyboard backlights 38 when the closing of the panel is detected. Detecting the closing of the panel may trigger other events as well.

According to one embodiment of the present invention, the predetermined application program is placed in a background mode when the panel is closed if the predetermined application program was not put in a foreground mode in response to user input.

According to another embodiment of the present invention, the extendable alphanumeric keyboard 40 comprises a QWERTY-style keyboard. Those of ordinary skill in the art will recognize that other alphanumeric keyboards may be used.

According to another embodiment of the present invention, the numeric keyboard 18 comprises a 12-key dial-pad. Those of ordinary skill in the art will recognize that other numeric keyboards may be used.

When the panel 28 is in the closed position, only the numeric keyboard is exposed. When the panel is in the open position, the alphanumeric keyboard 40 is exposed on one side of the mobile communications device, while the numeric keyboard 18 is exposed on the other side of the device. Thus, according to another embodiment of the present invention, the numeric keyboard is disabled if the panel is in the open position, thus guarding against unintended input from the numeric keyboard.

According to another embodiment of the present invention, a determination regarding whether keys on the numeric keyboard should be translated is based at least in part on whether the panel is in the open or closed position. This is explained in more detail below, with reference to FIG. 14.

Figure 14:
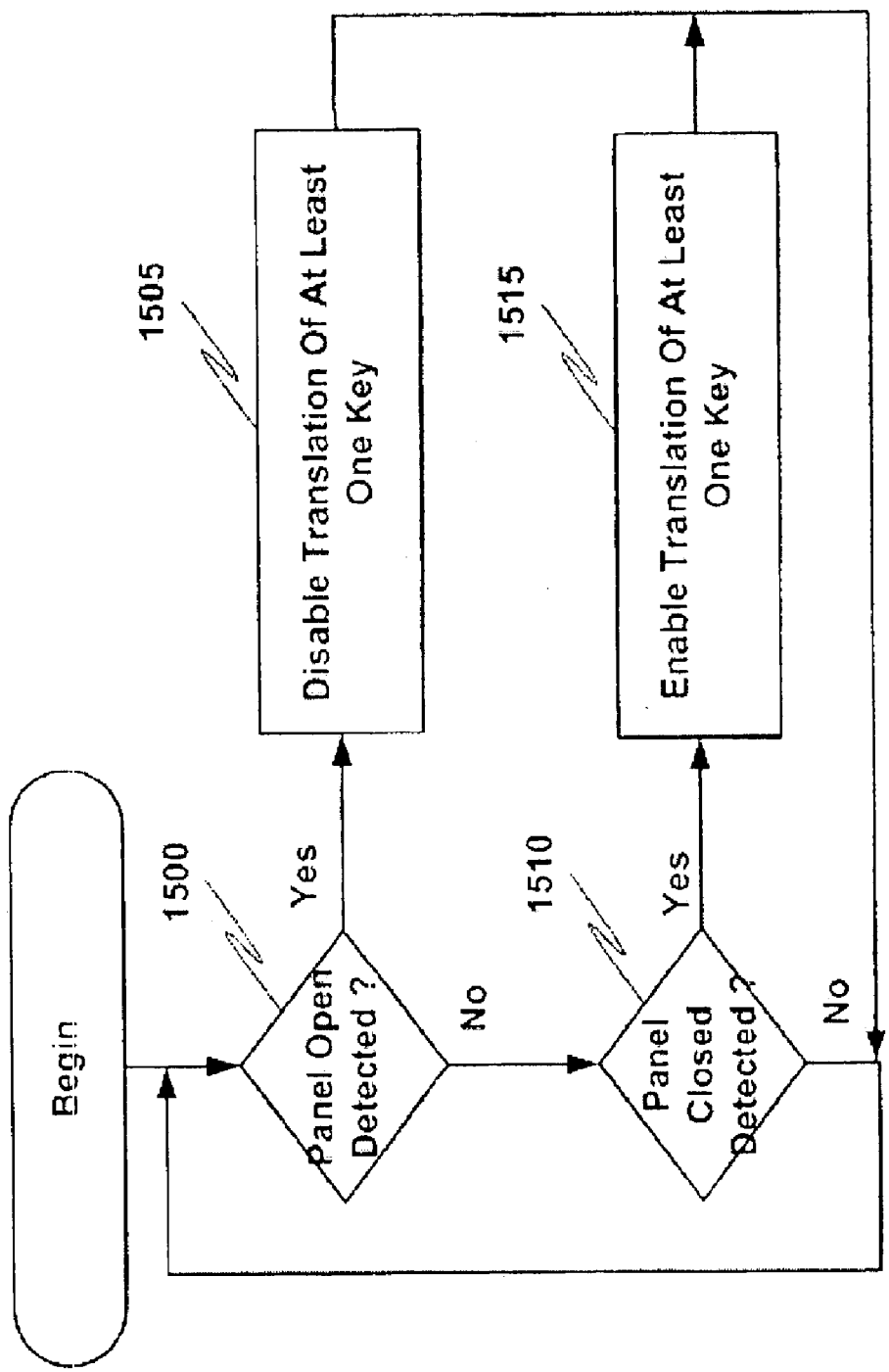
FIG. 14 is a flow diagram that illustrates a method for determining whether characters input on a communications device should be translated, in accordance with one embodiment of the present invention.

Turning now to FIG. 14, a flow diagram that illustrates a method for determining whether characters input on a communications device should be translated, in accordance with one embodiment of the present invention is presented. At 1500, the sensor 36 determines whether the panel 28 is in the open position. If the panel is in the open position, at 1505 translation of at least one key is disabled. In this case, the rendered text may differ from the entered text. By way of example, the entry "2-3-3" may be translated to and rendered as "BED" when the panel is in the open position. At 1510, a determination is made regarding whether the panel is in the closed position. If the panel is in the closed position, at 1515 translation of at least one key is enabled. In this case, the rendered text may differ from the entered text. By way of example, the entry "2-3-3" is not translated and is rendered as "233" when the panel is in the closed position.

According to another embodiment of the present invention, a determination regarding whether a matching algorithm to apply to characters input on a communications device is based at least in part on whether the panel is in the open or closed position. This is explained in more detail below, with reference to FIG. 15.

Figure 15:
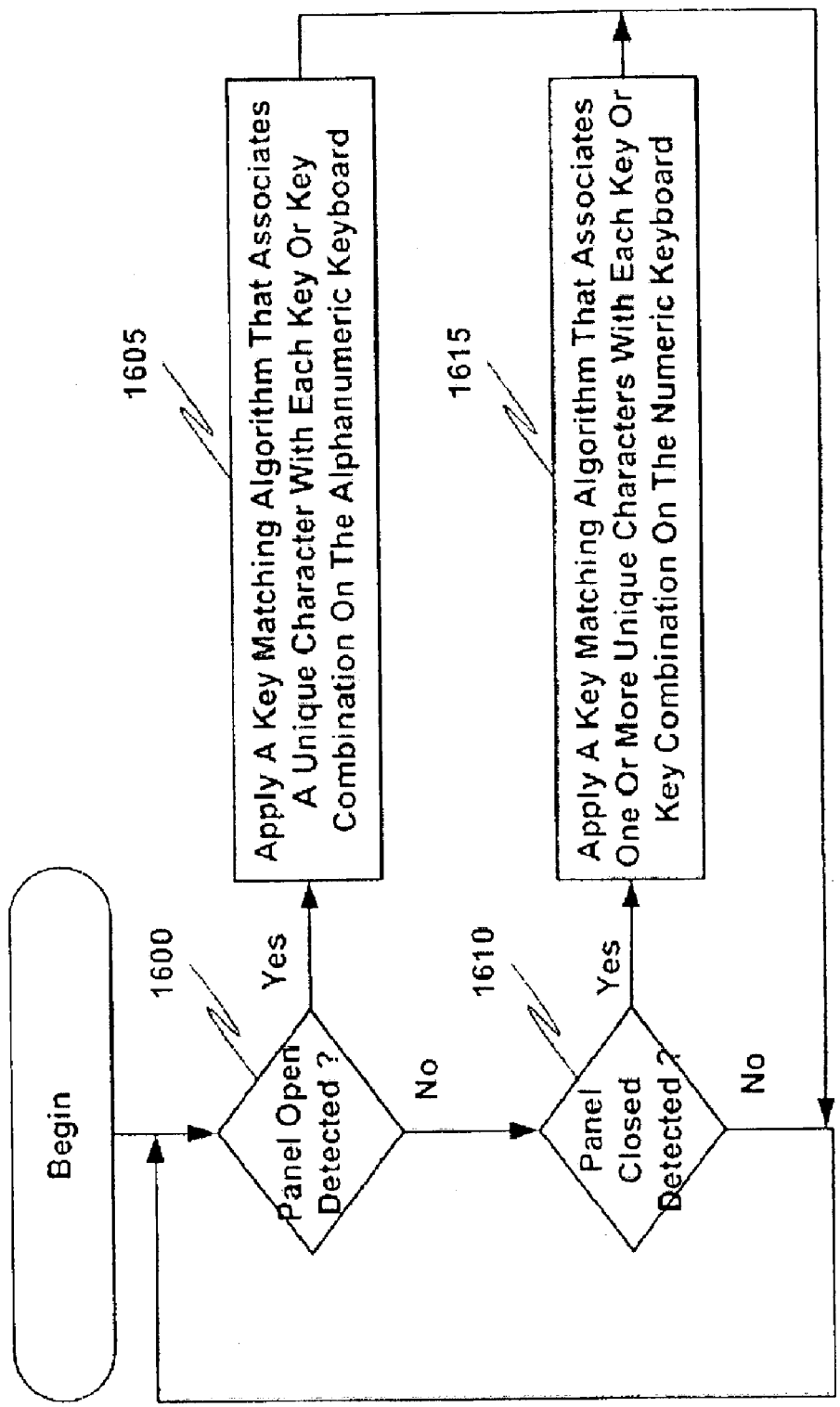
FIG. 15 is a flow diagram that illustrates a method for determining a matching algorithm to apply to characters input on a communications device in accordance with one embodiment of the present invention.

Turning now to FIG. 15, a flow diagram that illustrates a method for determining a matching algorithm to apply to characters input on a communications device, in accordance with one embodiment of the present invention is presented. At 1600, sensor 36 determines whether the panel is in the open position. If the panel is in the open position, at 1605 a key matching algorithm that associates a unique character with each key or key combination (e.g. <shift>2=@) on the alphanumeric keyboard is applied to entered keys. At 1610, a determination is made regarding whether the panel is in the closed position. If the panel is in the closed position, at 1615 a key matching algorithm that associates one or more unique characters with each key or key combination on the numeric keyboard is applied to entered keys. By way of example, the sequence "2-3-3" matches the number "233" when the panel is in the open position. Using the standard association between numbers and letters on a typical 12-digit dial-pad, the same sequence matches the character string "add", "bed" and "cef" (and others) when the panel is in the closed position.

The foregoing description of the specific embodiments will so fully reveal the general nature of the invention that others can, by applying current knowledge, readily modify and/or adapt for various applications such specific embodiments without departing from the generic concept. For instance, the display screen could be made larger to dominate the front of the device and/or a pointing device could be incorporated to aid data input. Also, it would be possible to incorporate alternative or additional hinge systems so that e.g. the display screen could fold over or under the keyboard. Therefore, such adaptations and modifications should and are intended to be comprehended within the meaning and range of equivalents of the disclosed embodiments. It is to be understood that the phraseology of terminology employed herein is for the purpose of description and not of limitation. Also, it should be understood that although SMS has been discussed extensively, capabilities of the device also include similar services such as enhanced messaging service (EMS), multimedia messaging service (MMS), instant messaging (IM), picture messaging and text chat, as well as receiving and inputting data from and to the Internet.

We claim:

1. A method for inputting characters on a mobile communication device having a housing, a display mounted on said housing, a numeric keyboard positioned on a front side of at least one hinged panel mounted on said housing, said device also having an alphanumeric keyboard comprising a first portion positioned on a back side of said panel and a second portion positioned on said housing and covered by said panel when said panel is in a closed position, the method comprising:

launching a predetermined application program when said panel is opened if said predetermined application program is not executing and if a home screen is in the foreground;

placing said predetermined application program in a foreground mode if said predetermined application program is executing in a background mode when said panel is opened and if said home screen is in the foreground; and placing said predetermined application program in said background mode if said predetermined application program is executing in said foreground mode when said panel is closed and if said predetermined application program was placed in said foreground mode in response to said panel being in said open position.

2. The method of claim 1 wherein said placing said predetermined application program in said background mode when said panel is closed is performed if said predetermined application program was not put in said foreground mode in response to user input after said panel was opened.

3. The method of claim 1, further comprising disabling said numeric keyboard if said panel is open.

4. The method of claim 1, further comprising disabling translation of at least one key on said numeric keyboard if said panel is open.

5. The method of claim 1 wherein said alphanumeric keyboard comprises a QWERTY-style keyboard.

6. The method of claim 1 wherein said numeric keyboard a 12-key dial-pad.

7. The method of claim 1, further comprising turning on a screen backlight of said device when said panel is opened.

8. The method of claim 1, further comprising:

turning on at least one key backlight of said alphanumeric keyboard when said panel is opened; and turning off said at least one key backlight of said alphanumeric keyboard when said panel is closed.

9. A method for inputting characters on a mobile communications device having a housing, a display mounted on said housing, a numeric keyboard positioned on a front side of at least one hinged panel mounted on said housing, said device also having an alphanumeric keyboard comprising a first portion positioned on a back side of said panel and a second portion positioned on said housing and covered by said panel when said panel is in a closed position, the method comprising:

step for launching a predetermined application program when said panel is opened if said predetermined application program is not executing and if a home screen is in the foreground;

step for placing said predetermined application program in a foreground mode if said predetermined application program is executing in a background mode when said panel is opened and if said home screen is in the foreground; and step for placing said predetermined application program in said background mode if said predetermined application program is executing in said foreground mode when said panel is closed and if said predetermined application program was placed in said foreground mode in response to said panel being in said open position.

10. The method of claim 9 wherein said step for placing said predetermined application program in said background mode when said panel is closed is performed if said predetermined application program was not put in said foreground mode in response to user input after said panel was opened.

11. The method of claim 9, further comprising step for disabling said numeric keyboard if said panel is open.

12. The method of claim 9, further comprising step for disabling translation of at least one key on said numeric keyboard if said panel is open.

13. The method of claim 9 wherein said alphanumeric keyboard comprises a QWERTY-style keyboard.

14. The method of claim 9 wherein said numeric keyboard comprises a 12-key dial-pad.

15. The method of claim 9, further comprising step for turning on a screen backlight of said device when said panel is opened.

16. The method of claim 9, further comprising:

step for turning on at least one key backlight of said alphanumeric keyboard when said panel is opened; and step for turning off said at least one key backlight of said alphanumeric keyboard when said panel is closed.

17. A program storage device readable by a machine, embodying a program of instructions executable by the machine to perform a method for inputting characters on a mobile communications device having a housing, a display mounted on said housing, a numeric keyboard positioned on a front side of at least one hinged panel mounted on said housing, said device also having an alphanumeric keyboard comprising a first portion positioned on a back side of said panel and a second portion positioned on said housing and covered by said panel when said panel is in a closed position, the method comprising:

launching a predetermined application program when said panel is opened if said predetermined application program is not executing and if a home screen is in the foreground;

placing said predetermined application program in a foreground mode if said predetermined application program is executing in a background mode when said panel is opened and if said home screen is in the foreground; and placing said predetermined application program in said background mode if said predetermined application program is executing in said foreground mode when said panel is closed and if said predetermined application program was placed in said foreground mode in response to said panel being in said open position.

18. The program storage device of claim 17 wherein said placing said predetermined application program in said background mode when said panel is closed is performed if said predetermined application program was not put in said foreground mode in response to user input after said panel was opened.

19. The program storage device of claim 17 wherein said method further comprises disabling said numeric keyboard if said panel is open.

20. The program storage device of claim 17 wherein said method further comprises disabling translation of at least one key on said numeric keyboard if said panel is open.

21. The program storage device of claim 17 wherein said alpha numeric keyboard comprises a QWERTY-style keyboard.

22. The program storage device of claim 17 wherein said numeric keyboard comprises a 12-key dial-pad.

23. The program storage device of claim 17 wherein said method further comprises turning on a screen backlight of said device when said panel is opened.

24. The program storage device of claim 17 wherein said method further comprises:
  turning on at least one key backlight of said alphanumeric keyboard when said panel is opened; and
  turning off said at least one key backlight of said alphanumeric keyboard when said panel is closed.

25. An apparatus for inputting characters on a mobile communications device having a housing, a display mounted on said housing, a numeric keyboard positioned on a front side of at least one hinged panel mounted on said housing, said device also having an alphanumeric keyboard comprising a first portion positioned on a back side of said panel and a second portion positioned on said housing and covered by said panel when said panel is in a closed position, the apparatus comprising:
  means for launching a predetermined application program when said panel is opened if said predetermined application program is not executing and if a home screen is in the foreground;
  means for placing said predetermined application program in a foreground mode if said predetermined application program is executing in a background mode when said panel is opened and if said home screen is in the foreground; and
  means for placing said predetermined application program in said background mode if said predetermined application program is executing in said foreground mode when said panel is closed and if said predetermined application program was placed in said foreground mode in response to said panel being in said open position.

26. The apparatus of claim 25 wherein said means for placing said predetermined application program in said background mode when said panel is closed is performed if said predetermined application program was not put in said foreground mode in response to user input after said panel was opened.

27. The apparatus of claim 25, further comprising means for disabling said numeric keyboard if said panel is open.

28. The apparatus of claim 25, further comprising means for disabling translation of at least one key on said numeric keyboard if said panel is open.

29. The apparatus of claim 25 wherein said alphanumeric keyboard comprises a QWERTY-style keyboard.

30. The apparatus of claim 25 wherein said numeric keyboard comprises a 12-key dial-pad.

31. The apparatus of claim 25, further comprising means for turning on a screen backlight of said device when said panel is opened.

32. The apparatus of claim 25, further comprising:
  means for turning on at least one key backlight of said alphanumeric keyboard when said panel is opened; and
  means for turning off said at least one key backlight of said alphanumeric keyboard when said panel is closed.

33. A mobile communications device comprising:
  a housing;
  a display mounted on said housing;
  a numeric keyboard positioned on a front side of at least one hinged panel mounted on said housing;
  an alphanumeric keyboard comprising:
    a first portion positioned on a back side of said panel; and
    a second portion positioned on said housing and covered by said panel when said panel is in a closed position; and
  a processor configured to:
    launch a predetermined application program when said panel is opened if said predetermined application program is not executing and if a home screen is in the foreground;
    place said predetermined application program in a foreground mode if said predetermined application program is executing in a background mode when said panel is opened and if said home screen is in the foreground; and
    place said predetermined application program in said background mode if said predetermined application program is executing in said foreground mode when said panel is closed and if said predetermined application program was placed in said foreground mode in response to said panel being in said open position.

34. The mobile communications device of claim 33 wherein said processor is further configured to place said predetermined application program in said background mode when said panel is closed if said predetermined application program was not put in said foreground mode in response to user input after said panel was opened.

35. The mobile communications device of claim 33 wherein said processor is further configured to disable said numeric keyboard if said panel is open.

36. The mobile communications device of claim 33 wherein said processor is further configured to disable translation of at least one key on said numeric keyboard if said panel is open.

37. The mobile communications device of claim 33 wherein said alphanumeric keyboard comprises a QWERTY-style keyboard.

38. The mobile communications device of claim 33 wherein said numeric keyboard comprises a 12-key dial-pad.

39. The mobile communications device of claim 33 wherein said processor is further configured to turn on a screen backlight of said device when said panel is opened.

40. The mobile communications device of claim 33 wherein said processor is further configured to:
  turn on at least one key backlight of said alphanumeric keyboard when said panel is opened; and
  turn off said at least one key backlight of said alphanumeric keyboard when said panel is closed.

* * * * *